No. 702,971.  
Patented June 24, 1902.
O. LA RUE.
FUMIGATING POULTRY ROOST.
(Application filed Dec. 14, 1901.)
(No Model.)
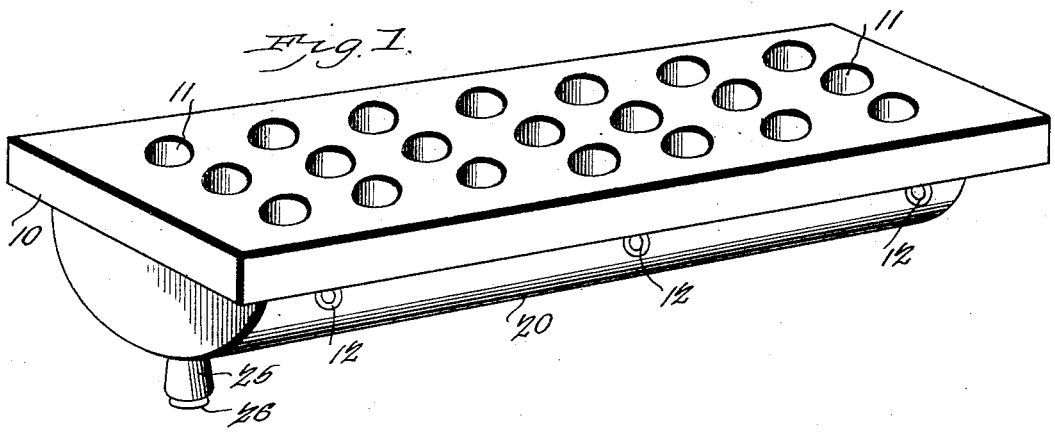
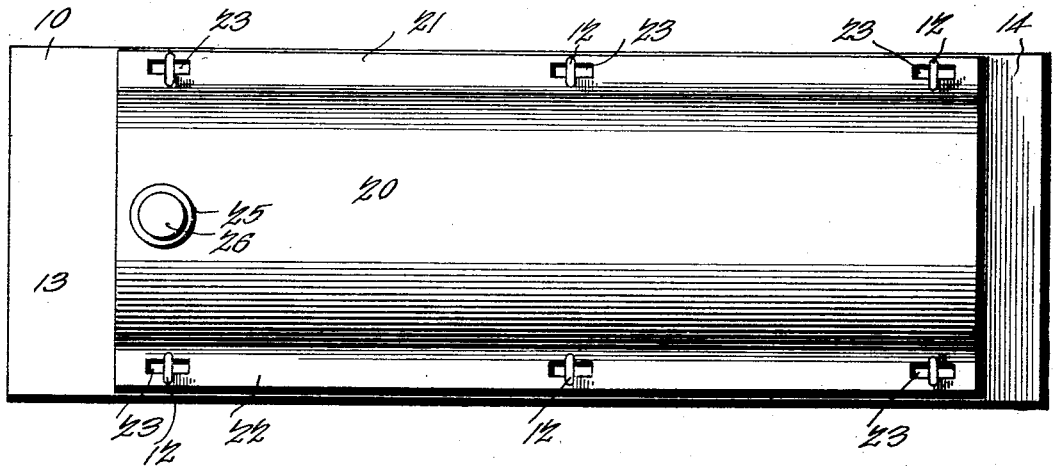
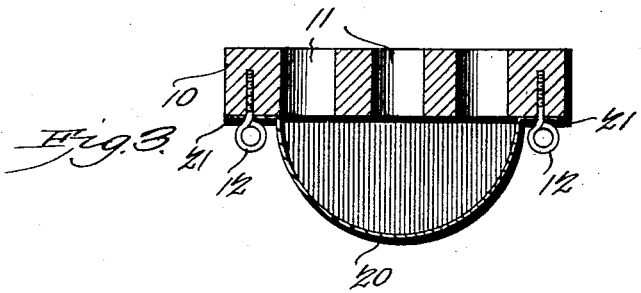
Witnesses  
Oliver LaRue, Inventor.  
by  
Attorneys

UNITED STATES PATENT OFFICE.

OLIVER LA RUE, OF HOLTON, INDIANA.

FUMIGATING POULTRY-ROOST.

SPECIFICATION forming part of Letters Patent No. 702,971, dated June 24, 1902.

Application filed December 14, 1901. Serial No. 85,949. (No model.)

*To all whom it may concern:*

Be it known that I, OLIVER LA RUE, a citizen of the United States, residing at Holton, in the county of Ripley and State of Indiana, have invented a new and useful Fumigating Poultry-Roost, of which the following is a specification.

This invention relates to fumigating poultry-roosts for fowls of various kinds, which will be found to be practically vermin-proof and which is adapted to keep the fowls roosting thereon in a like condition.

The object of the invention is to provide a fumigator which may be used as a roost or as a rest for nests and one in which the fumigating composition is not liable to get in contact with the feet of the fowl.

Figure 1 of the accompanying drawings represents a perspective view of a hen-roost constructed according to my invention. Fig. 2 represents a bottom plan view thereof. Fig. 3 represents a transverse vertical section thereof.

The same reference-numerals indicate corresponding parts in all the figures.

In the form illustrated in the drawings a plate or bar 10 is shown provided throughout its length with perforations, as 11. This plate may be composed of metal, wood, or any suitable material, but is preferably composed of wood, because of its non-conducting properties, which render it more comfortable for the feet and body of a fowl resting thereon. This plate 10 is provided on its under side, along the opposite edges thereof, with longitudinally-alined screw-eyes, as 12, for a purpose hereinafter described. A receptacle or trough 20, composed of any suitable material, preferably metal, is adapted to be connected to the under side of said perforated plate 10, and it may be of any desired shape. In the form illustrated a semicylindrical trough 20 is shown provided with flanges 21 and 22 on its opposite edges and closed at its opposite ends. The flanges 21 and 22 are provided with longitudinally-alined slots, as 23, adapted to engage the screw-eyes, as 12, on the under side of the plate 10. This trough is also provided with a suitable spout 25, disposed on its bottom, near one end thereof, for emptying the trough of its contents when desired. A suitable closure is provided for this spout and is preferably in the form of a cork 26. The trough 20 is made shorter than the plate 10 and is secured thereon so as to leave two projecting ends 13 and 14, which are adapted to engage suitable supports. (Not shown.)

In the operation of this device the screw-eyes, as 12, are turned with their eyes at right angles to the ends of the plate. The slots, as 23, are then passed over said eyes and the eyes again turned a quarter of a revolution or until the openings therein are at right angles to the edges of the plate and transversely across the slots. The stopper 26 is then placed in the spout 25, and the fumigating composition or liquid may be inserted through the apertures, as 11, or it may be placed in the trough before it is attached to the plate. The device is then placed in position to receive the fowls, and it may be used either as a roost or as a bottom for a nest. When used as a roost, it is placed with the projecting ends 13 and 14 resting on a suitable support, and the fowls perch themselves on the top of the perforated plate 10 directly over the perforations, as 11, therein, and the fumes arising from the composition contained in the trough pass up through the perforations in the plate into contact with the feet and body of the fowl and thoroughly permeate the feathers thereof, destroying any parasites which may be on the fowl and ridding them of such undesirable pests.

I claim as my invention—

1. A fumigating poultry-roost comprising a perforated plate or bar, and a receptacle arranged beneath and extending over the perforated area of the plate or bar and adapted to contain a fumigating liquid or composition, said plate or bar being detachably secured to the receptacle and being extended beyond the same and adapted to support the receptacle, substantially as described.

2. A fumigating poultry-roost comprising a perforated plate or bar and a receptacle arranged beneath and extending over the perforated area of the bar or plate and adapted to contain a fumigating liquid or composition, said plate or bar forming a cover for the receptacle and having its perforations of a size to permit the liquid or composition to be readily poured into the receptacle through them and the said receptacle being provided with a drain-opening to permit the composition or liquid to be readily drawn off, substantially as described.

3. A fumigating poultry-roost comprising a perforated plate or bar, and a receptacle arranged beneath and detachably secured to the plate or bar and terminating short of the ends thereof and provided with a drain-opening, substantially as described.

4. A fumigating poultry-roost comprising a perforated plate or bar, and an approximately semicylindrical receptacle arranged beneath the plate or bar and extending over the perforated area of the same and provided at one end with a drain-opening, said receptacle being provided with longitudinal side flanges detachably secured to the plate or bar, substantially as described.

In testimony that I claim the foregoing as my own I have hereto affixed my signature in the presence of two witnesses.

OLIVER LA RUE.

Witnesses:
 FRANCIS M. BEACH,
 JOHN W. SIMPERS.